(12) United States Patent
Sonstroem

(10) Patent No.: US 7,485,849 B2
(45) Date of Patent: Feb. 3, 2009

(54) LIGHT SENSOR PROTECTION AND METHOD FOR PROTECTING A LIGHT SENSOR WITH LASER RADIATION ATTENUATING GAS

(75) Inventor: Jaime Sonstroem, Springfield, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 185 days.

(21) Appl. No.: 11/381,377

(22) Filed: May 3, 2006

(65) Prior Publication Data

US 2007/0257187 A1 Nov. 8, 2007

(51) Int. Cl.
*H01J 40/14* (2006.01)
*H01J 5/02* (2006.01)
(52) U.S. Cl. .................... 250/239; 250/351; 359/227
(58) Field of Classification Search ................. 359/227, 359/228, 252, 253; 250/239, 351
See application file for complete search history.

(56) References Cited

U.S. PATENT DOCUMENTS

| | | | | |
|---|---|---|---|---|
| 4,063,096 | A | * | 12/1977 | Roberts ...................... 250/343 |
| 5,080,865 | A | * | 1/1992 | Leiner et al. ............... 422/68.1 |
| 6,785,032 | B1 | | 8/2004 | Le Mere |
| 2002/0162963 | A1 | * | 11/2002 | Lannestedt et al. .......... 250/351 |
| 2006/0150721 | A1 | * | 7/2006 | Kley ........................... 73/105 |

* cited by examiner

*Primary Examiner*—Thanh X Luu
*Assistant Examiner*—Francis M Legasse, Jr.
(74) *Attorney, Agent, or Firm*—Andrew Romero; John Raubitschek

(57) ABSTRACT

A light sensor protection system and method protects a light sensor system from a laser threat. The light sensor system has a sensor housing which contains optical elements disposed within the sensor housing and at a first end of the housing to converge light rays entering the housing at a focal plane. A focal plane array is disposed within the sensor housing substantially coincident with the focal plane. A means for protecting the light sensor system from a laser threat is disposed within the housing remote from the optical elements, the light rays, and the focal plane array. The method includes the steps of (a) providing a light sensor system as described above; and (b) protecting the light sensor system from a laser threat in the presence of a laser threat or upon a warning thereof with the means for protecting the light sensor system from a laser threat.

11 Claims, 1 Drawing Sheet ated by the Government of the United States of America.

LIGHT SENSOR PROTECTION AND METHOD FOR PROTECTING A LIGHT SENSOR WITH LASER RADIATION ATTENUATING GAS

GOVERNMENT INTEREST

The invention described herein may be manufactured, used, sold, imported, and/or licensed by or for the Government of the United States of America.

FIELD OF THE INVENTION

The present invention generally relates to light sensors and more particularly to methods and devices for protecting light sensors in the event of a laser threat.

BACKGROUND OF THE INVENTION

Sensors that respond to light can be susceptible to exposure to laser radiation, such as laser threats (often referred to as countermeasures) and laser hazards (unintentional dangers). Research has sought to protect some sensors from these countermeasures. Such endeavors generally have one or more shortcomings, either in terms of sensor performance, cost, complexity, space required, etc.

It is known that certain gases can be used to attenuate specific laser lines with high efficiency. Previous attempts to protect a light sensor against laser countermeasures have involved filling a chamber within the sensor with an absorptive gas and attempting to permanently seal the chamber. Accordingly, the absorptive gas would constantly be in the light sensor's optical path. For a gas designed to protect against an in-band threat, this results in reduced in-band transmission and, therefore, constantly reduced sensor performance. In addition, the housing or chamber containing the gas within the light sensor needs to be well-sealed to prevent leakage over the lifetime of the sensor. This requires additional monitoring and constant maintenance efforts of a chamber.

What is needed is a low cost solution which lacks these shortcomings under normal operating conditions and which can be implemented when needed.

SUMMARY OF THE INVENTION

There is a need for a low cost light sensor protection system. The light sensor system has a sensor housing which contains optical elements disposed within the sensor housing and at a first end of the housing to converge light rays entering the housing at a focal plane. A focal plane array is disposed within the sensor housing substantially coincident with the focal plane. A means for protecting the light sensor system from a laser threat is disposed within the housing remote from the optical elements, the light rays, and the focal plane array.

The invention is also directed to a method of protecting a light sensor system from a laser threat that includes the steps of (a) providing a light sensor system having a sensor housing; optical elements disposed both within the sensor housing and at a first end of the housing, the optical elements converging light rays entering the housing at a focal plane; a focal plane array disposed substantially coincident with the focal plane; and means for protecting the light sensor system from a laser threat, the light sensor protection system disposed within the housing remote from the optical elements, the light rays, and the focal plane array; and (b) protecting the light sensor system from a laser threat in the presence of a laser threat or upon a warning thereof with the means for protecting the light sensor system from a laser threat.

More particularly, one aspect of the invention relates to a low cost light sensor protection system that does not reduce performance of the sensor.

Another aspect of the invention relates to a low cost light sensor protection system of minimal complexity.

Yet another aspect of the invention relates to a low cost light sensor protection system that requires little or no additional monitoring and maintenance efforts.

To the accomplishment of the foregoing and related ends, the invention provides the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the detailed description that follows, identical components have been given the same reference numerals.

DETAILED DESCRIPTION

Figure 1:
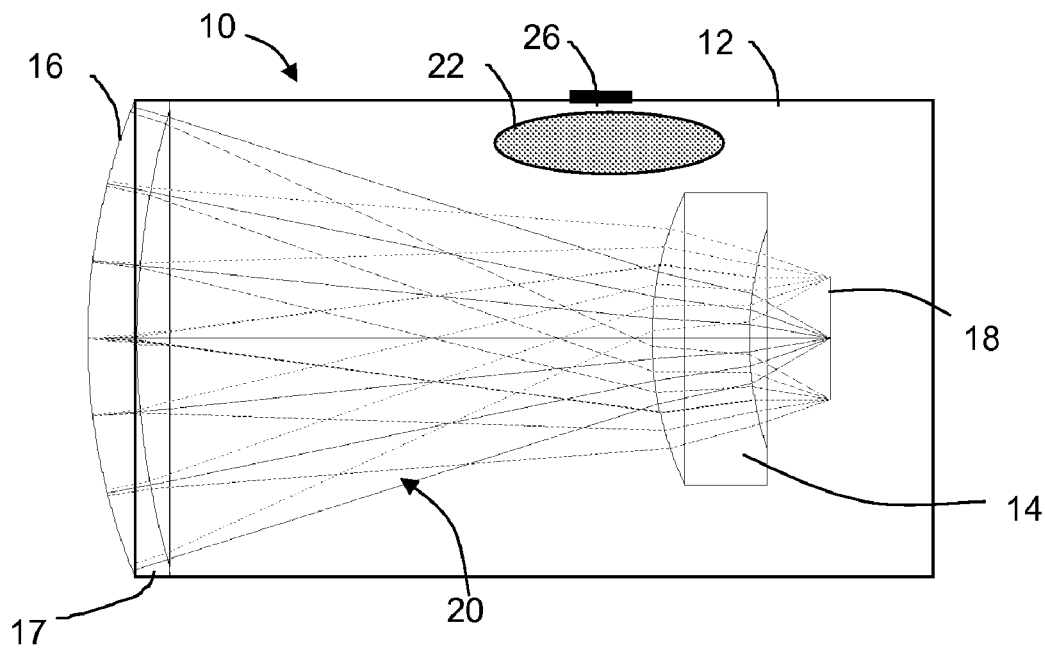
FIG. 1 is a schematic diagram of the invention before activation of the sensor protection system.

Referring now to the drawings, and initially to FIG. 1, the present invention provides a light sensor protecting system 10. The system includes a sensor housing 12 that is provided with optical elements 14 and 16, disposed within and at a first end 17 of the housing, respectively, and so arranged as to converge optical rays 20 produced by the optical elements 14 and 16 at a focal plane. A focal plane array 18 is located behind optical element 14 and coincides with the focal plane. A laser radiation attenuating gas container 22, such as a capsule, balloon, etc., having a laser radiation attenuating gas 24 (see, FIG. 2 for released attenuating gas 24) placed therein, is positioned within housing 12 so that it does not interfere with or block optical elements 14, 16, focal plane array 18, or optical rays 20. A port 26 is located in the wall of the sensor housing 12 at or proximate the location of the laser radiation attenuating gas container 22. A means 28 for breaching the laser radiation attenuating gas container 22, shown in FIG. 2, is disposed proximate the port 26.

The choice of material from which the laser radiation attenuating gas container 22 is formed depends on what means for breaching 28 the laser radiation attenuating gas container is employed in the system or vice versa. A breachable material, for example, a frangible or rupturable material, is generally preferred. Thus, the laser radiation attenuating gas container 22 is a replaceable container, such as a balloon, a replaceable capsule, or the like. As such, in one embodiment, it is formed from a thin flexible rubber or plastic. With such materials, a means for exerting a large amount of force over a small area, i.e., a piercing device, such as a pin, pick, knife tip or other sharp tipped instrument, may be used as the means for breaching 28 the laser radiation attenuating gas container 22. Alternatively, when the container is formed from a thin, rigid and frangible material, an instrument used to slice (as with a knife edge) or crush (as with a plunger) the capsule may be used. A thermoplastic material may also be used to form the gas containing capsule, in which case a resistive heating element may be used to melt and thereby breach the capsule.

Figure 2:
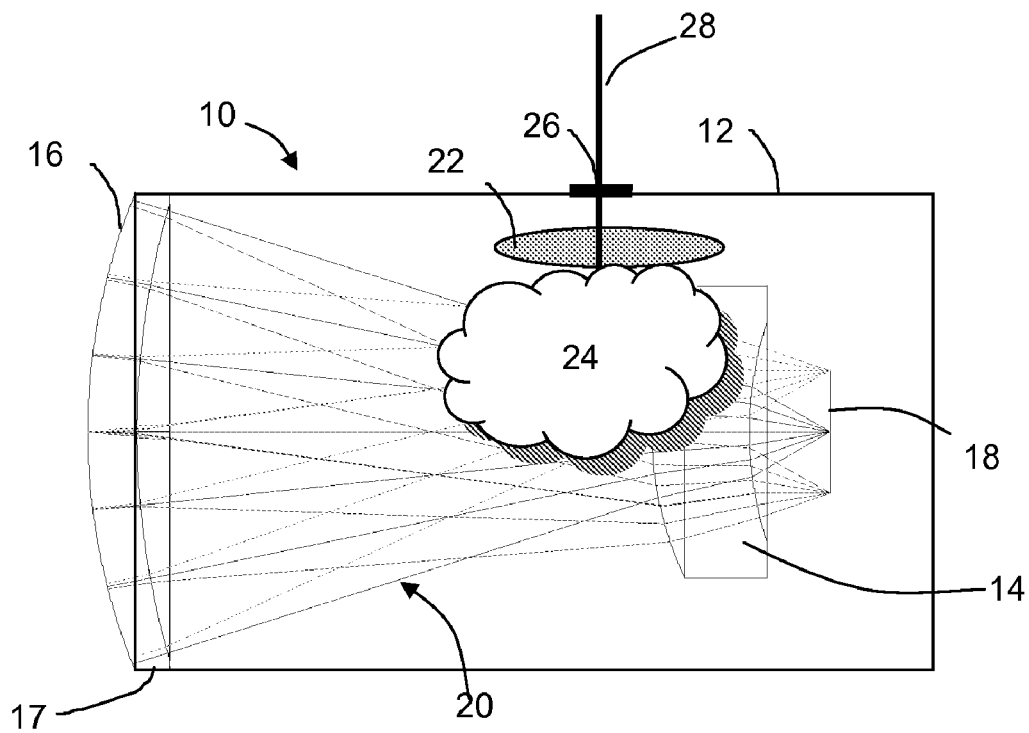
FIG. 2 is a schematic diagram of the invention after activation of the sensor protection system.

With reference to FIG. 2, in use, when a laser threat is present, or upon warning thereof, the means for breaching 28 the laser radiation attenuating gas container 22 passes through (in a preferred embodiment) the port 26 from the exterior of the housing to crush or puncture the laser radiation attenuating gas container 22 and thereby releasing the laser radiation attenuating gas 24 into the sensor housing 12. The gas then distributes itself uniformly within the sensor housing, including in the optical path, thus protecting the focal plane from the laser threat.

For simplicity, ease of construction and ease of replacement, when the means for breaching 28 the laser radiation attenuating gas container is intended to strike, cut or pierce the laser radiation attenuating gas container, such means are typically placed outside the sensor housing 12 at the port 26. At such location, when the means for breaching 28 the laser radiation attenuating gas container is actuated, the working end of the striking, cutting or piercing end of the instrument may pass through the port 26 to contact the container.

The type of port 26 used depends on the nature of the means for breaching 28 the laser radiation attenuating gas container employed in the system. In all applications, the port is intended to serve the dual functions of adequately providing a fluid impervious seal when a suitable sealing means (discussed below) is disposed in the port and to allow the means for breaching 28 the laser radiation attenuating gas container, or control means therefore, to pass therethrough. When a narrow piercing type of instrument is used, a self-sealing septum or plug may be used in the port through which the instrument passes. If a wider breaching implement is used, a gasket may be disposed in the port through which the implement passes. A somewhat rigid gasket may be used if the implement is intended to slide through an aperture in the gasket or a flexible gasket may be employed if the gasket adheres to the implement and is intended to flex with the motion of the implement. Typically, a rubber or plastic material will be used to form the septum, plug, gasket, or the like. If a resistive heating element is used, electrical wires from a source of electrical power to the heating element can be fed through a port taking the form of a very small aperture in the wall of the housing 12 and a suitable sealing material can be used to cover and/or fill the aperture, or the wires may be contained entirely within the housing, and not require a port.

The pressure of the gas in the laser radiation attenuating gas container 22 may be maintained at the same or a different pressure than that existing in the housing, external to the container. Typically, the pressure of the gas in the laser radiation attenuating gas container 22 is somewhat greater than in the housing, external to the laser radiation attenuating gas container, in order to assure rapid dispersal of the gas throughout the housing once the gas container has been breached. In some instances, a laser radiation attenuating gas 24 can be compressed to the liquid state within the capsule, thereby attaining a gaseous state when released. This would allow storage of higher volumes of the gas within the sensor housing 12. If necessary, with this embodiment, the housing can contain a pressure release valve for limiting the pressure within the sensor to a desired level.

The laser radiation attenuating gas container 22, once breached, may be exchanged with a new gas-filled container to further protect the sensor system. Replacement may be achieved with suitable means provided in the sensor housing 12. Thus, either the sealing means in the port 26 or the optical element 14 may be designed to be opened or removed to allow sufficient access to the interior of the housing 12 to replace the container. Alternatively, a door may be provided in a wall of the housing for such access.

It should be understood by those with ordinary skill in the art that the term "light" as used herein includes visible light, as well as other wavebands, for example, near infrared, shortwave infrared, midwave infrared, longwave infrared or the like.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components (assemblies, devices, sensors, circuits, etc), the terms (including a reference to a "means") used to describe such components are intended to correspond, unless otherwise indicated, to any component which performs the specified function of the described component (i.e., functionally equivalent), even though not structurally equivalent to the disclosed structure which performs the function in the herein illustrated exemplary embodiments of the invention. For example, a means and method may be provided for the manual or automatic reloading of laser radiation attenuating gas containers in the sensor housing a feeder mechanism therein. In addition, as an alternative, provisions may be made for the gas to be injected from outside the housing, using an external capsule, or dispensing can, or gas dispensing cartridge, such as a CO2 type cartridge used in gas propellant guns or carbonated liquid dispensers, through the port of the sensor housing. In addition, while a particular feature of the invention may have been disclosed with respect to only one of several embodiments, such feature may be combined with one or more other features of the other embodiments as may be desired and advantageous for any given or particular application.

What is claimed is:

1. A light sensor system comprising:
   a sensor housing having a port in its wall, the sensor housing containing optical elements disposed within the sensor housing and disposed at a first end of the housing to converge light rays entering the housing at a focal plane;
   a focal plane array disposed substantially coincident with the focal plane; and
   means disposed within the housing outside of the optical elements, the light rays, and the focal plane array for protecting the light sensor system from a laser threat,
   the protecting means including a container formed from a breachable material and positioned proximate the port, the container filled with a laser radiation attenuating gas; and
   means for breaching the container disposed externally of the housing and proximate the port, the breaching means adapted to pass through the port to contact the container.

2. The light sensor system according to claim 1, wherein the container is a replaceable capsule.

3. The light sensor according to claim 1, wherein the container is a replaceable balloon.

4. The light sensor according to claim 1, wherein the laser radiation attenuating gas is in a compressed liquid state which converts to a gaseous state when the container is breached.

5. The light sensor system according to claim 1, wherein the means for breaching the container comprises an implement for exerting a large amount of force over a small area.

6. The light sensor system according to claim 1, wherein the means for breaching the container comprises a piercing implement.

7. The light sensor system according to claim 1, wherein the means for breaching the container comprises a cutting implement.

8. The light sensor system according to claim 1 wherein the means for breaching the container comprises a crushing implement.

9. The light sensor system according to claim 1, wherein the port includes a means for providing a fluid impervious seal.

10. In a light sensor system having a sensor housing which contains optical elements disposed within the sensor housing and disposed at a first end of the housing to converge light rays entering the housing at a focal plane and a focal plane array disposed substantially coincident with the focal plane, means disposed within the housing outside of the optical elements, the light rays, and the focal plane array for protecting the light sensor system from a laser threat, the means for protecting the light sensor system comprising a readily replaceable container formed from a breachable material and filled with a laser radiation attenuating gas, the housing having a port with a fluid impervious seal located in a wall thereof proximate the container; and means for breaching the container disposed externally of the housing and proximate the port and adapted to pass through the port to contact the container.

11. A method of protecting a light sensor system from a laser threat comprising the steps of:

(a) providing a light sensor system having:

a sensor housing, optical elements disposed within the sensor housing and at a first end of the housing, the optical elements converging light rays entering the housing at a focal plane, a focal plane array disposed substantially coincident with the focal plane, and means disposed within the housing outside of the optical elements, the light rays, and the focal plane array, for protecting the light sensor system from a laser threat and comprising a readily replaceable container formed from a breachable material that is filled with a laser radiation attenuating gas and is adapted to be breached in the presence of a laser threat or upon a warning thereof, and (b) protecting the light sensor system from a laser threat in the presence of a laser threat or upon a warning thereof with the means for protecting the light sensor system from a laser threat by actuating a means for breaching the container to breach the container in the presence of a laser threat or upon a warning thereof, the means for breaching the container being disposed externally of the housing and proximate a port with a fluid impervious seal located in a wall of the housing proximate the container, the breaching means being adapted to pass through the port to contact the container in the presence of a laser threat or upon a warning thereof.

\* \* \* \* \*